United States Patent
Tripathi et al.

(10) Patent No.: US 12,266,347 B2
(45) Date of Patent: Apr. 1, 2025

(54) END-TO-END MULTI-TALKER OVERLAPPING SPEECH RECOGNITION

(71) Applicant: Google LLC, Mountain View, CA (US)

(72) Inventors: Anshuman Tripathi, Mountain View, CA (US); Han Lu, Santa Clara, CA (US); Hasim Sak, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/055,553

(22) Filed: Nov. 15, 2022

(65) Prior Publication Data

US 2023/0084758 A1 Mar. 16, 2023

Related U.S. Application Data

(63) Continuation of application No. 16/865,075, filed on May 1, 2020, now Pat. No. 11,521,595.

(51) Int. Cl.
*G10L 15/06* (2013.01)
*G06N 3/08* (2023.01)
(Continued)

(52) U.S. Cl.
CPC .............. *G10L 15/063* (2013.01); *G06N 3/08* (2013.01); *G06N 20/00* (2019.01); *G10L 15/04* (2013.01); *G10L 15/16* (2013.01)

(58) Field of Classification Search
CPC ......... G10L 15/063; G10L 15/04; G06N 3/08; G06N 20/00
See application file for complete search history.

(56) References Cited

U.S. PATENT DOCUMENTS 9,818,431 B2 * 11/2017 Yu ..................... G10L 21/0272
10,249,305 B2   4/2019 Yu
(Continued)

FOREIGN PATENT DOCUMENTS

JP   2019-95526 A    6/2019
WO  2019198265 A1  10/2019

OTHER PUBLICATIONS

Shafey, L. E., et al. (2019). Joint speech recognition and speaker diarization via sequence transduction (Year: 2019).*
(Continued)

*Primary Examiner* — Bhavesh M Mehta
*Assistant Examiner* — Nandini Subramani
(74) *Attorney, Agent, or Firm* — Honigman LLP; Brett A. Krueger; Grant Griffith

(57) ABSTRACT

A method for training a speech recognition model with a loss function includes receiving an audio signal including a first segment corresponding to audio spoken by a first speaker, a second segment corresponding to audio spoken by a second speaker, and an overlapping region where the first segment overlaps the second segment. The overlapping region includes a known start time and a known end time. The method also includes generating a respective masked audio embedding for each of the first and second speakers. The method also includes applying a masking loss after the known end time to the respective masked audio embedding for the first speaker when the first speaker was speaking prior to the known start time, or applying the masking loss prior to the known start time when the first speaker was speaking after the known end time.

16 Claims, 9 Drawing Sheets

(51) Int. Cl.
*G06N 20/00* (2019.01)
*G10L 15/04* (2013.01)
*G10L 15/16* (2006.01)

(56) References Cited

U.S. PATENT DOCUMENTS

| | | |
|---|---|---|
| 10,460,727 B2 | 10/2019 | Droppo et al. |
| 10,957,337 B2 | 3/2021 | Chen et al. |
| 2017/0178666 A1 | 6/2017 | Yu |
| 2017/0337924 A1* | 11/2017 | Yu .................. G10L 19/022 |
| 2018/0254040 A1 | 9/2018 | Droppo et al. |
| 2019/0318725 A1* | 10/2019 | Le Roux ............. G10L 15/16 |
| 2019/0318757 A1* | 10/2019 | Chen .................. G10L 19/022 |

OTHER PUBLICATIONS

Rao, Wei, et al. "Target speaker extraction for overlapped multi-talker speaker verification." (2019) (Year: 2019).*

L. Sun et al., "A Two-stage Single-channel Speaker-dependent Speech Separation Approach for Chime-5 Challenge," ICASSP 2019—2019 IEEE International Conference on Acoustics, Speech and Signal Processing (ICASSP), Brighton, UK, 2019, pp. 6650-6654 (Year: 2019).*

Indian Examination Report for the related Application No. 202227059807, dated Jan. 9, 2023, 7 pages.

USPTO, Office Action relating to U.S. Appl. No. 16/865,075, dated Mar. 7, 2022.

S. Settle, et.al., "End-to-End Multi-Speaker Speech Recognition," 2018 IEEE International Conference on Acoustics, Speech and Signal Processing (ICASSP), 2018, pp. 4819-4823 (Year: 2018).

Yoshioka, et.al <http://et.al> . . . (2018). Recognizing overlapped speech in meetings: A multichannel separation approach using neural network Year: 2018).

O. Cetin and E. Shriberg, "Speaker Overlaps and ASR Errors in Meetings: Effects Before, During, and After the Overlap," 2006 IEEE International Conference on Acoustics Speech and Signal Processing Proceedings, 2006, pp. I-I (Year: 2006).

Yoshioka, T., Erdogan, H., Chen, Z., Xiao, X., & Alleva, F. (2018). Recognizing overlapped speech in meetings: A multichannel separation approach using neural networks. arXiv preprint arXiv:1810. 03655 (Year: 2018).

Li, J., Zhao, R., Hu, H., & Gong, Y. (Dec. 2019). Improving RNN transducer modeling for end-to-end speech recognition. In 2019 IEEE Automatic Speech Recognition and Understanding Workshop (ASRU) (pp. 114-121). IEEE (Year: 2019).

Chen, Z., Luo, Y., & Mesgarani, N. (Mar. 2017). Deep attractor network for single-microphone speaker separation. In 2017 IEEE International Conference on Acoustics, Speech and Signal Processing (ICASSP) (pp. 246-250). IEEE. (Year: 2017).

Japanese Patent Office. Office Action relating to application No. JP 2022-566423, dated Dec. 14, 2023.

* cited by examiner

END-TO-END MULTI-TALKER OVERLAPPING SPEECH RECOGNITION

CROSS-REFERENCE TO RELATED APPLICATIONS

This U.S. patent application is a continuation of, and claims priority under 35 U.S.C. § 120 from, U.S. patent application Ser. No. 16/865,075, filed on May 1, 2020. The disclosure of this prior application is considered part of the disclosure of this application and is hereby incorporated by reference in its entirety.

TECHNICAL FIELD

This disclosure relates to speech recognition.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides a method of training a speech recognition model with a loss function. The method includes receiving, at the data processing hardware, a training example including an audio signal including a first segment corresponding to audio spoken by a first speaker, a second segment corresponding to audio spoken by a second speaker, and an overlapping region where the first segment overlaps the second segment. The overlapping region includes a known start time and a known end time. For each of the first speaker and the second speaker, the method includes generating, by the data processing hardware, a respective masked audio embedding based on the training example. The method also includes determining, by the data processing hardware, whether the first speaker was speaking prior to the known start time of the overlapping region or after the known end time of the overlapping region. When the first speaker was speaking prior to the known start time of the overlapping region, the method includes applying, by the data processing hardware, to the respective masked audio embedding for the first speaker, a first masking loss after the known end time. When the first speaker was speaking after the known end time of the overlapping region, the method includes applying, by the data processing hardware, to the respective masked audio embedding for the first speaker the masking loss to the generated masked audio embedding before the known start time.

Implementations of the disclosure may include one or more of the following optional features. In some implementations, when the first speaker was speaking prior to the known start time of the overlapping region, the method includes applying, by the data processing hardware, to the respective masked audio embedding for the second speaker, a second a second masking loss prior to the known start time of the overlapping region. In these implementations, when the first speaker was speaking after the known end time of the overlapping region, the method also includes applying, by the data processing hardware, to the respective masked audio embedding for the second speaker, the second masking loss after the known end time of the overlapping region. In these implementations, for each of the respective masked audio embeddings generated for the first speaker and the second speaker, the method may also include computing, by the data processing hardware, a respective average speaker embedding for the respective one of the first speaker or the second speaker inside the overlapping region and computing, by the data processing hardware, a respective average speaker embedding for the respective one of the first speaker or the second speaker outside the overlapping region. Here, the method further includes determining, by the data processing hardware, an embedding loss based on a function of the average speaker embedding computed for the respective masked audio embedding for the first speaker inside the overlapping region, the average speaker embedding computed for the respective masked audio embedding for the second speaker inside the overlapping region, the average speaker embedding computed for the respective masked audio embedding for the first speaker outside the overlapping region, and the average speaking embedding computed for the respective masked audio embedding for the second speaker outside the overlapping region and applying, by the data processing hardware, the embedding loss to each of (i) the respective masked audio embedding generated for the first speaker to enforce that an entirety of the respective masked audio embedding generated for the first speaker corresponds to only audio spoken by the first speaker and (ii) the respective masked audio embedding generated for the second speaker to enforce that an entirety of the respective masked audio embedding generated for the second speaker corresponds to only audio spoken by the second speaker.

Another aspect of the disclosure provides a system of training a speech recognition model with a loss function. The system includes data processing hardware and memory hardware in communication with the data processing hardware. The memory hardware stores instructions that when executed on the data processing hardware cause the data processing hardware to perform operations. The operations include receiving a training example including an audio signal including a first segment corresponding to audio spoken by a first speaker, a second segment corresponding to audio spoken by a second speaker, and an overlapping region where the first segment overlaps the second segment. The overlapping region includes a known start time and a known end time. For each of the first speaker and the second speaker, the operations include generating a respective masked audio embedding based on the training example. The operations also include determining whether the first speaker was speaking prior to the known start time of the overlapping region or after the known end time of the overlapping region. When the first speaker was speaking prior to the known start time of the overlapping region, the operations include applying, to the respective masked audio embedding for the first speaker, a first masking loss after the known end time. When the first speaker was speaking after the known end time of the overlapping region, the operations include applying, to the respective masked audio embedding for the first speaker, the masking loss to the generated masked audio embedding before the known start time.

Implementations of the disclosure may include one or more of the following optional features. In some implementations, when the first speaker was speaking prior to the known start time of the overlapping region, the operations include applying, to the respective masked audio embedding for the second speaker, a second a second masking loss prior to the known start time of the overlapping region. In these implementations, when the first speaker was speaking after the known end time of the overlapping region, the operations also include applying, to the respective masked audio embedding for the second speaker, the second masking loss after the known end time of the overlapping region. In these implementations, for each of the respective masked audio embeddings generated for the first speaker and the second speaker, the operations may also include computing a respective average speaker embedding for the respective one of the first speaker or the second speaker inside the overlapping region and computing a respective average speaker embedding for the respective one of the first speaker or the second speaker outside the overlapping region. Here, the operations further include determining an embedding loss based on a function of the average speaker embedding computed for the respective masked audio embedding for the first speaker inside the overlapping region, the average speaker embedding computed for the respective masked audio embedding for the second speaker inside the overlapping region, the average speaker embedding computed for the respective masked audio embedding for the first speaker outside the overlapping region, and the average speaking embedding computed for the respective masked audio embedding for the second speaker outside the overlapping region and applying the embedding loss to each of (i) the respective masked audio embedding generated for the first speaker to enforce that an entirety of the respective masked audio embedding generated for the first speaker corresponds to only audio spoken by the first speaker and (ii) the respective masked audio embedding generated for the second speaker to enforce that an entirety of the respective masked audio embedding generated for the second speaker corresponds to only audio spoken by the second speaker.

In some examples, when the first speaker was speaking prior to the known start time of the overlapping region, the first speaking was not speaking after the known end time of the overlapping region and when the first speaker was speaking after the known end time of the overlapping region, the first speaker was not speaking prior to the known start time of the overlapping region. Generating the masked audio embedding may occur at each frame of the audio signal for the training example. The training example may correspond to a monophonic audio signal. The training example may include simulated training data.

In some examples, the speech recognition model includes a recurrent neural network transducer (RNN-T) architecture. Here, the RNN-T architecture may include a first decoder configured to receive, as input, the respective masked audio enbedding for the first speaker and to generate, as output, a first transcription associated with the first speaker, the first transcription transcribing the first segment of the audio signal that corresponds to the audio spoken by the first speaker and a second decoder configured to receive, as input, the respective masked audio embedding generated for the second speaker and to generate, as output, a second transcription associated with the second speaker, the second transcription the second segment of the audio signal that corresponds to the audio spoken by the second speaker. The speech recognition model may include an audio encoder configured to, during inference, generate per frame embeddings from a monophonic audio stream comprising speech spoken by two or more different speakers and to communicate each frame audio embedding to a masking mode. Here, the masking model is trained to generate, for each frame audio embedding, a respective masked audio embedding. Optionally, the training example may further include a first ground truth transcript corresponding to the audio spoken by the first speaker and a second ground truth transcript corresponding to the audio spoken by the second speaker.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
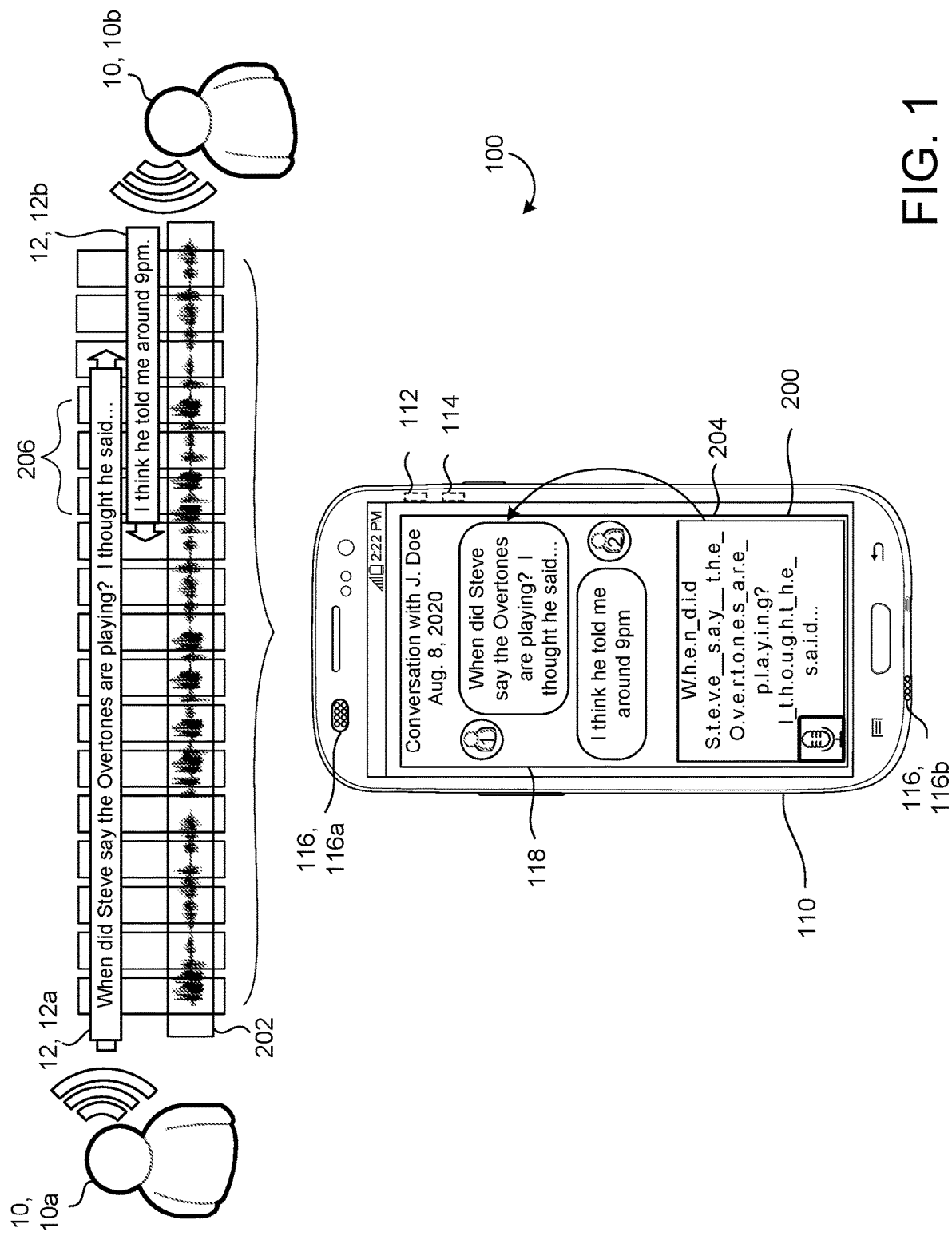
FIG. 1 is a schematic view of an example of an example speech environment using a multi-talker speech recognizer.

Oftentimes in conversations, it is common for people to talk at the same time or overlap when talking. For instance, one speaker may interrupt another speaker or there may be a pause and more than one participant in the conversation begins talking following the pause. With technology today, it may be even easier for one or more speakers to overlap in a conversation. For example, when the speakers are communicating through technology (e.g., a real-time communication application or software), every speaker may not be visible to understand body language or in-conversation communication queues. Without the queues of a face-to-face conversation, pauses or other hesitations by one speaker may cause two or more speakers to talk over each other. This portion of the conversation where speakers are talking over each other may be referred to as overlapping speech or multi-talker speech since more than one speaker is talking simultaneously.

When a speaker is talking over another speaker, speech recognition systems may have difficulty performing speech recognition, and in speech recognition systems capable of performing diarization, have difficulty determining who is speaking when. In other words, the speech recognition system may have trouble distinguishing which speaker is speaking when and, due to the overlap, what is actually being said by each speaker when speakers talk over each other. Unfortunately, this situation may prove problematic when a participant in the conversation is trying to use speech recognition functionality during the conversation or during post-conversation processing. For example, during the conversation, a participant may generate a transcript based on the audio of the conversation. When the speech recognition system generating the transcript encounters an overlapping speech segment, the speech recognition system may fail to identify the correct speaker (or any speaker) or do a poor job actually transcribing the content of the conversation (e.g., the words spoken) due to the combined acoustics in the overlapping speech segment. These difficulties may be further amplified when there are several participants in the conversation and multiple speakers chime in at the same time. For instance, this may occur at a group meeting or other type of assembly of people. This issue, often referred to as the cocktail party problem, has long burdened speech recognition systems.

Another complication with overlapping speech is that the audio generated or received by a speech recognition system may occur in a single channel. A sound channel generally refers to an independent audio signal collected by a recording system. Here, if each participant in a conversation had an independent audio channel, even though overlapping speech may occur, the speech recognition system would be able to use the independent channels to aid in identification of a speaker and/or transcript generation for the speech content during the overlapping speech. In contrast, with a single channel, the speech recognition system does not have the luxury of using other channels to aid the speech recognition process. Instead, unfortunately, the speech recognition system has to interpret the single channel alone and the audio signal mixes the speech of multiple speakers together in an overlapping speech segment. A communication application, such as a video conferencing application, may transcribe audio received on a single channel that may include speech spoken by all participants of a communication session. Similarly, an audio recording application executing on a user device, such as a mobile device of a patient placed in a doctor's office to record a conversation between a doctor and the patient, may record audio on a single channel that includes speech spoken between the doctor and the patient where there may be occurrences of overlapping speech where both the patient and doctor are speaking simultaneously.

As speech recognition systems have developed, a few approaches have been attempted to address multi-talker audio segments. One more common approach is to recognize the speakers of a multi-talker audio segment by first performing source separation on the audio from multiple speakers. Once these systems separated the sources, these systems would proceed to perform speech recognition (e.g., automatic speech recognition (ASR)) on the separated speech. Generally with this approach, the source separation on a single channel input is done by predicting a mask for Fast Fourier Transforms (FFTs) and then generating the speaker specific audio signal from the masked FFTs. Yet this source separation approach requires a speech separation model separate from and in addition to a traditional speech recognition system (e.g., ASR system).

By having an additional speech separation model, this type of multi-talker approach does not lend itself to be an end-to-end speech recognition system. End-to-end speech recognition systems are setup to integrate previously separated models of a speech recognition system (e.g., acoustic, language, and pronunciation models as well as the speech separation model). These integrated models seek to use a single neural network to directly map an audio waveform (i.e., input sequence) to an output sentence (i.e., output sequence); resulting in a sequence-to-sequence approach, which generates a sequence of words (or graphemes) when given a sequence of audio features. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

In another approach to address multi-talker audio segments, a speech recognition system may be trained using permutation-invariant training (PIT). Although this PIT training approach does not require a separate speech separation model, in order to train a speech recognition system in this manner, alignment information is required between labels and audio during training time. By needing alignment information, the training process has inherently increased complexity. PIT training generally refers to a process where training includes examples of all possible permutations of speaker alignment such the training process represents all permutations (or a significant portion) of overlapping speech. This helps ensure that, during inference, the speech recognition system is not biased towards a particular permutation or type of alignment of overlapping speech. With having to account for a significant population of permutations during training, the PIT process demands an intensive training process for the speech recognition system.

To overcome some of these issues with multi-talker speech, a conventional recurrent neural network transducer (RNN-T) may be augmented to decode speech from overlapping speakers. RNN-T models are a type of E2E model that is capable of learning the alignment between acoustic features and label features from training data rather than using an attention mechanism. For example, an RNN-T model uses forward-backward alignment loss during training. Unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters (e.g. as grapheme outputs) one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and able to run offline (i.e., without a network connection); therefore, avoiding unreliability issues with communication networks.

Furthermore, a conventional RNN-T model has proven to be a reliable "on device" speech recognition system. An "on-device" speech recognition system is hosted "on-device," by a device that receives the audio input and uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model. Without being reliant upon a remote connection, an on-device speech recognition system is less vulnerable to latency issues and/or inherent unreliability of communication networks. To improve the usefulness of speech recognition by avoiding these issues, speech recognition systems again evolved into a form of a sequence-to-sequence model known as a recurrent neural network transducer (RNN-T).

An RNN-T model may be adapted into a multi-talker speech recognition system that recognizes single channel speech with multiple talkers. Here, the multi-talker speech recognition system may be trained using simulated training data with defined parameters such that the order of speakers within a training example is known. In other words, with simulated training data, the training examples do not need to be made permutation invariant to speaker order like that of a PIT process. This is because simulated training examples may be configured with known parameters such as speaker order and start and stop times for overlapping speech segments within a training example. For a multi-talker RNN-T, the speaker separation is not done at the source level, but instead at the level of features from an encoder of the multi-talker RNN-T. To perform the speaker separation at the level of features, a multi-talker speech recognizer employs a masking model. By using a masking model at the feature level, the multi-talker speech recognizer is able to be trained as an E2E model.

FIG. 1 is an example of a speech environment 100. In the speech environment 100, a user's 10 manner of interacting with a computing device, such as a user device 110, may be through voice input. The user device 110 (also referred to generally as a device 110) is configured to capture sounds (e.g., streaming audio data 202) from one or more users 10, 10a-b (also referred to as speakers) within the speech-enabled environment 100. Here, the streaming audio data 202 captured by the device 110 includes an audible communication containing utterances 12, 12a-b spoken by one or more users 10. Speech-enabled systems of the device 110 may receive the audible communication and perform speech related functionality based on the audio data 200 (e.g., transcription, queries, speaker identification, etc.).

Here, the user device 110 captures the audio data 202 of a conversation between two users 10 (e.g., shown as a first user 10a and a second user 10b). The user device 110 may correspond to any computing device associated with a user 10 (also referred to as a speaker 10) and capable of receiving audio data 202. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116. The user device 110 (e.g., using the hardware 112, 114) is further configured to perform speech recognition processing on the streaming audio data 202 using a speech recognizer 200. In some examples, the audio subsystem 116 of the user device 110 that includes the audio capture device 116a is configured to receive audio data 202 (e.g., spoken utterances 12) and to convert the audio data 202 into a digital format compatible with the speech recognizer 200. The digital format may correspond to acoustic frames (e.g., parameterized acoustic frames), such as mel frames. For instance, the parameterized acoustic frames correspond to log-mel filterbank energies.

In some examples, such as FIG. 1, the user 10 interacts with a program or application 118 of the user device 110 that uses the speech recognizer 200. The user 10 may explicitly invoke the application 118 (e.g., via a user input) to commence recording audio data 202, and similarly, the user 10 may instruct the application 118 to cease recording the audio data 202. For instance, FIG. 1 depicts the user 10a, Ted, communicating (e.g., speaking) with a second user 10b, Ted's friend named Jane. Here, the conversation of speech utterances 12 between Ted 10a and Jane 10b may be received/captured as audio data/signals 202 at the user device 110 (e.g., at a communication application 118 of the user device 110). In these examples, the communication application 118 uses the speech recognizer 200 to transcribe the voice inputs 12 of both the Ted 10a and Jane 10b (i.e., their conversation) in the monophonic audio data 202 captured at the user device 110. Here, the audio capture device 116a captures the audio data 202 containing the utterances 12 and converts the audio data 202 into a digital form (e.g., acoustic frames) for the speech recognizer 200. The speech recognizer 200 processes these acoustic frames to generate a transcript 204 that may be displayed on a screen of the user device 110 by the communication application. As FIG. 1 illustrates, the speech recognizer 200 is able to transcribe the conversation as a sequence of characters as spoken by Ted 10a and Jane 10b. For example, when Ted 10a speaks the utterance 12a that asks Jane 10b "when did Steve say the Overtones are playing?", the communication application 118 (e.g., using the speech recognizer 200) transcribes the utterance 12a spoken by Ted 10a into corresponding text for presentation in the transcript 204 of the conversation.

In this example, Ted 10a follows his own question by starting to conjecture what he thought Steve said, "I thought he said . . . ." At that same instance, Jane 10b thought to answer Ted's question and responds with the utterance 12b, "I think he told me around 9 pm." Because Ted 10a starts to answer his own question and Jane 10b did not anticipate this, Ted 10a and Jane 10b talk over each other to form an overlapping speech segment 206 where they are both speaking. That is, in the example, the overlapping speech segment 206 includes a segment where a portion of the utterance 12a spoken by Ted 10a overlaps with a portion of the utterance 12b spoken by Jane 10b. In some configurations, the audio capture device 116a communicates these speech audio signals 202 containing the mixed speech (i.e., overlapping speech segment 206) as monophonic audio data (e.g., audio data on a single channel) to the speech recognizer 200. As such, the speech recognizer 200, when generating the transcript 204, recognizes the multi-talker overlapping segment 206 and properly converts this segment 206 into a transcript 204 that correctly identifies that Ted 10a spoke the words "I thought he said" while Jane 10b answered "I think he told me around 9 pm." FIG. 1 illustrates a two party conversation (e.g., with two speakers 10a-b), but the functionality of the speech recognizer 200 may be scaled to any number of speakers.

Although not shown, the principles of the speech recognizer 200 may also be applicable to audio interactions between synthetic speech and one or more speakers (e.g., user(s) 10). For instance, a user 10 conversing with an automated assistant (e.g., a speech-activated assistant application 118) executing on the user device 110, may ask "What time is the concert tonight?" but then proceeds to speak as the automated assistant answers the question. Here, like with Jane, the speech recognizer 200 is capable of generating a transcript 204 that properly identifies the content of the speech and/or which party, whether synthetic or not, is the source of the speech within an audio signal 202. As such, the transcript 204 may omit including a textual representation of any audio that includes synthesized/synthetic speech output by the automated assistant. Alternatively, it may be imaginable that although the automated assistant is generating an output of audible synthetic speech, a user 10 of the user device 110 interrupts or talks over the audible synthetic speech output. In this alternative, the speech recognizer 200 may still output a correct sequence of words (e.g., to form a transcript 204 of the conversation).

Figure 2A:
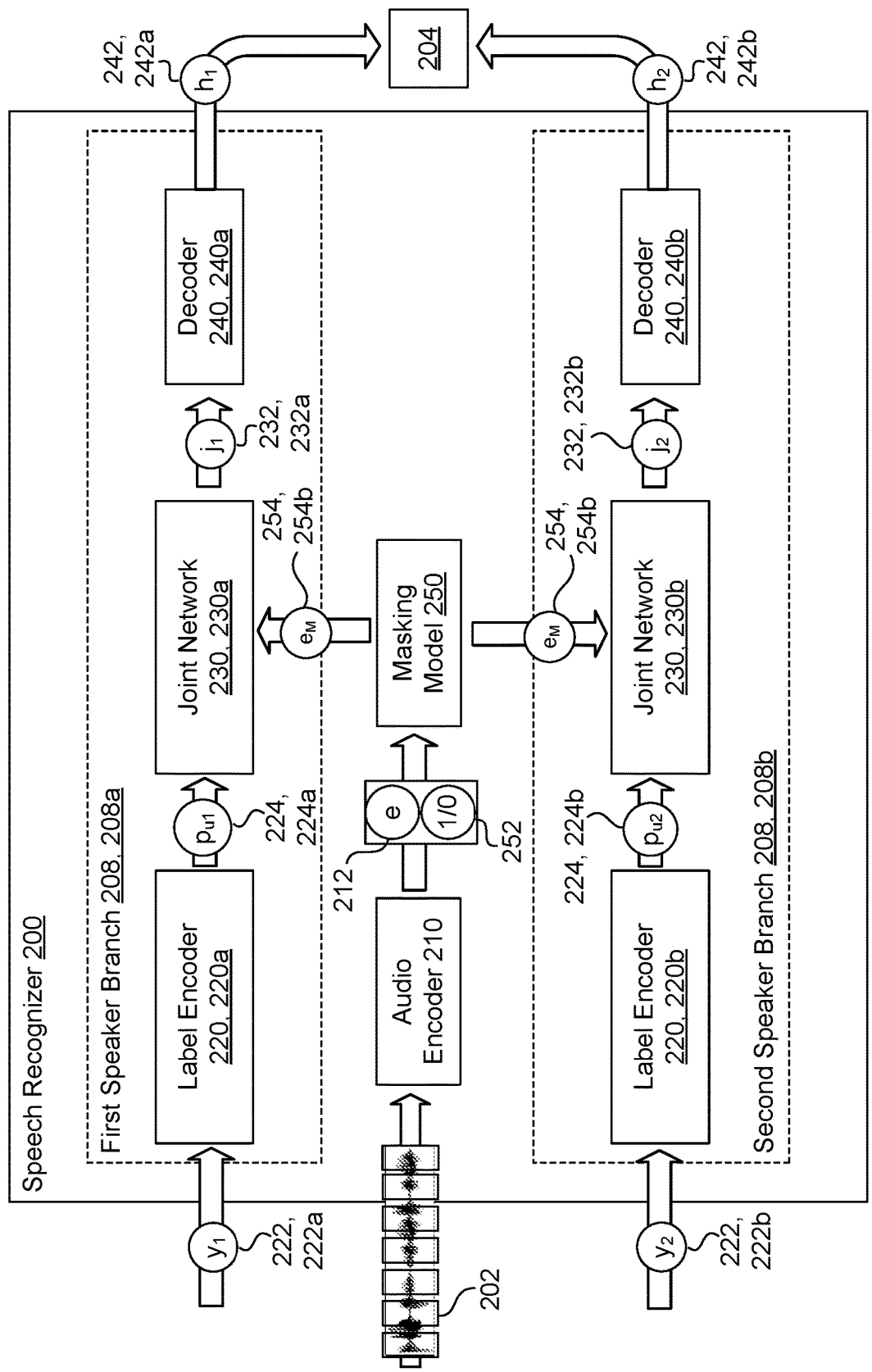
FIGS. 2A and 2B are schematic views of example multi-talker speech recognizers.
Figure 2B:
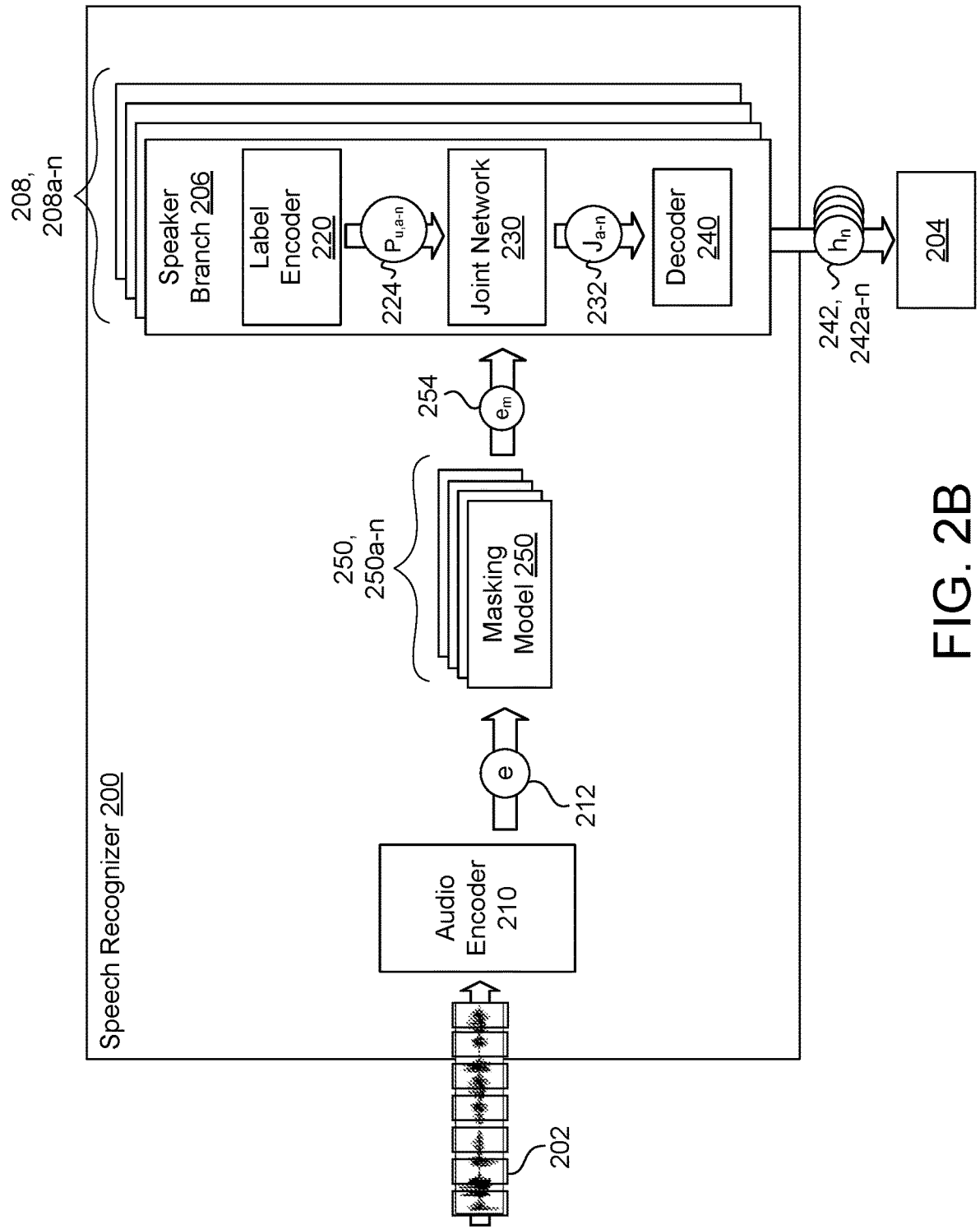

Referring to FIGS. 2A and 2B, the speech recognizer 200 may include a Recurrent Neural Network-Transducer (RNN-T) model architecture. Generally speaking, an RNN-T model is a neural network model corresponding to an encoder-decoder framework that can be trained end-to-end to map input sequences (e.g., input audio signals) to target sequences (e.g., words or characters spoken in the audio signals). In other words, given an input sequence (e.g., of real-valued vectors), an RNN-T model tries to predict a target sequence of labels. Here, the input sequence may be raw feature vectors, such as log-mel filterbank energy features or other neural network encoded features.

In a conventional RNN-T model architecture, the RNN-T model includes an encoder network and a decoder network. Here, the encoder network includes an audio encoder 210 and a label encoder 220. The audio encoder 210 is an encoder (e.g., a long-short term memory (LSTM) neural network) that is analogous to an acoustic model (AM) that receives acoustic feature vectors $x_t \in \mathbb{R}^d$. For instance, the audio encoder 210 includes a plurality of LSTM layers (e.g., five to seven layers). The label encoder 220 is an encoder (e.g., also a LSTM neural network) that functions much like a language model (LM). The label encoder 220 accepts a previous grapheme label prediction $y_{u-1}$ output by the model 200 during a previous time step as input 222, and computes an output vector $p_u$ as an output 224. Here, the label encoder 220 may act as a recurrent prediction network over the output symbols of the RNN-T model. For each combination of acoustic frame input $x_t$ (e.g., shown as audio signal inputs 202) and label $y_u$ (e.g., shown as the input 222 for the label encoder 220) at a particular time frame t, the audio encoder 210 outputs an encoder embedding e as an output 212 and the label encoder 220 generates a label encoder embedding $p_u$ as a predicted output 224. Though not shown in the multi-talker speech recognizer 200 of FIG. 2A, in a convention RNN-T model, each of these outputs 212, 224 are passed to a joint network 230 (e.g., a feed forward neural network) to compute output logits j as outputs 232 that will be fed into a decoder including a softmax layer 240. The decoder 240 defines a probability distribution over the set of output targets for each combination of acoustic frame input $x_t$ and label $y_u$. A softmax layer may receive the output of the decoder 240 an select the output target label $y_u$ associated with the highest probability. Hence, the RNN-T is often described as an end-to-end model because it can be configured to directly output graphemes without the aid of an additional external language model.

The conditional probability distribution for RNN-T can be expressed as:

$$P(y|x) = \sum_{\hat{y} \in \mathcal{A}(x,y)} \prod_{i=1}^{T} P(\hat{y}_i | x_1, \ldots, x_t, y_0, y_1, \ldots, y_u(t-1)) \quad (1)$$

where $x_i$ is a feature vector (e.g., a vector of 80-dimensional log-Mel filterbank features for each frame 1 . . . T). The ground-truth label sequence of length U is denoted as $y_1, y_2, \ldots, y_u$ where $y_u \in S$ (S is the set of grapheme symbols). In some examples, a special symbol $y_0 =$ <sos> indicates the start of the sequence. For the convenience of formulation, S is augmented with an additional blank symbol <b>, and the set of all possible alignments is described as follows: $\hat{y} = (\hat{y}_1 \ldots \hat{y}_T) \in \mathcal{A}(x,y)$, where $\mathcal{A}(x,y)$ represents all label sequences $\hat{y} \in \{S \cup \langle b \rangle\}^T$ such that $\hat{y}$ is equal to y when <b> is removed. With this notation in place, the conditional probability of labeling given the acoustics P(y|x) is obtained by simply summing over the alignments. The probability of seeing some label in an alignment $\hat{y}_t$ is conditioned on the acoustic features up to time t and the history of non-blank labels, $y_1 \ldots y_{u(t-1)}$, emitted so far. The only independence assumption made is that the probability of a partial alignment $\hat{y}_{1 \ldots t}$ up to time t does not depend on acoustic features from future frames. This enables inference in a streaming fashion, alleviating the need to wait for all of the audio before beginning the computation. This not only speeds up execution, but also produces recognition results as the audio is being processed.

Referring further to FIGS. 2A and 2B, the speech recognizer 200 is configured as a variant or modified version of a conventional RNN-T model. In some examples, instead of passing the output 212 of the audio encoder 210 to the joint network 230, the speech recognizer 200 uses a masking model 250 to mask the encoded embeddings 212 output from the audio encoder 210. Here, the encoded audio embeddings 212 output from the audio encoder 210 encode the monophonic audio signal 202 (e.g., features of the audio signal 202). In other words, the audio encoder 210 generates an audio embedding 212 that encodes a monophonic audio signal 202 including an overlapping speech segment 206. For instance, the audio signal 202 is a form of a single-channel (e.g., monophonic) mixed audio from two or more speakers (e.g., the first and second users 10a-b). By masking the encoded embeddings 212 output from the audio encoder 210, the masking model 250 functions to separate features of each speaker 10 in the monophonic audio signal 202.

In some implementations, audio embeddings 212 output from the audio encoder 210 are concatenated with a fixed input 252 (e.g., on a frame by frame basis) in order to signify which speaker to mask at the masking model 250. The fixed input 252 corresponds to a label indicating a speaker 10 associated audio embedding 212 at each frame. Here, the speech recognizer 200 may perform the concatenation at the audio encoder 210 (e.g., during output 212 generation) or as an initial step at the making model 250. In FIG. 2A, when an audio embedding 212 for a given frame is associated with a fixed input 252 assigned to the first speaker 10a (e.g., shown as a fixed input of zero (0)), the masking model 250 generates a respective masked embedding 254, 254a for the first speaker 10a. Conversely, when an audio embedding 212 for a given frame is associated with a fixed input 252 assigned to the second speaker 10b (e.g., shown as a fixed input of one (1)), the masking model 250 generates a respective masked embedding 254, 254b for the second speaker 10b. Stated differently, the fixed input 252 indicates which speaker the masking model 250 should mask for each frame of the encoded embedding 212 output from the audio encoder 210.

In some examples, such as FIGS. 2A and 2B, the speech recognizer 200 includes a respective branch 208 for each speaker 10. With a respective branch 208 for each speaker 10, each branch 208 may generate a respective output sequence of symbols (e.g., characters or words) that correspond audio spoken by a particular speaker 10. Continuing the example of FIG. 1 where two speakers 10a, 10b are conversing with each other, FIG. 2A shows the speech recognizer including a first branch 208a for the first speaker 10a and a second branch 208b for the second speaker 10b. On the other hand, FIG. 2B shows a scalable speech recognizer 200 with n number of branches 208.

With reference to FIG. 2A, the first branch 208a for the first speaker 10a includes a first label encoder 220, 220a, a first joint network 230, 230a, and a first decoder 240, 240a dedicated to the first speaker 10a, while the second branch 208b for the second speaker 10b includes a second label encoder 220, 220b, a second joint network 230, 230b, and a second decoder 240, 240b dedicated to the second speaker 10a. Described in greater detail below, the first decoder 240a is configured to generate an output sequence 242, 242a of symbols for the first speaker 10a (e.g., transcribes the segment of the audio signal 202 corresponding to the utterance 12a spoken by first speaker 10b), the second decoder 240b is configured to generate an output sequence 242, 242b of symbols corresponding to audio spoken by the second speaker 10b (e.g., transcribes the segment of the audio signal 202 corresponding to the utterance 12b spoken by the second speaker 10b).

Figure 3A:
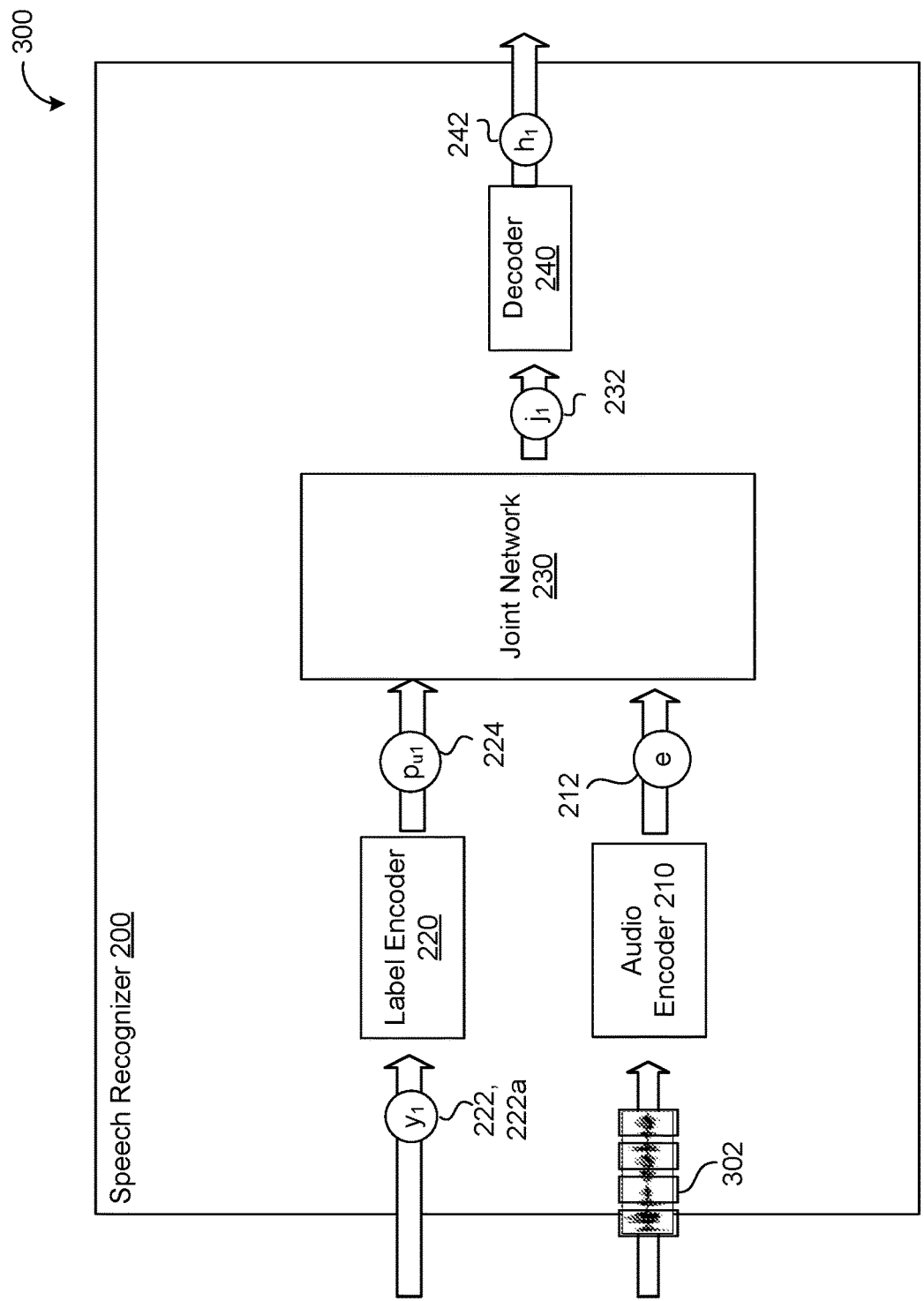
FIGS. 3A-3D are schematic views of example training processes for a multi-talker speech recognizer.

By having a separate branch 208 dedicated to each potential different speaker 10, the speech recognizer 200 may have a few advantages. One such advantage may be that the speech recognizer 200 may jointly train like components together. For example, during a training process 300 (FIG. 3A) all of the label encoders 220, all of the joint networks 230, and/or all of the soft max layers 240 may be trained together rather than individually.

Another advantage may be that since the audio encoder 210 receives a mixed monophonic audio signal 202, the audio encoder 210 does not need to be duplicated for each branch 208 of the speech recognizer 200. Rather in this branched structure, the audio encoder 210 along with the masking model 250 may function in a centralized manner to feed inputs into each branch 208 of the speech recognizer 200. For instance, a single masking model 250 is shown in FIG. 2A to generate respective masked audio embeddings 254, 254a-b pertinent to each branch 208 (e.g., a respective masked embeddings 254a for the first branch 208a and a respective masked audio embeddings 254b for the second branch 208b). In other words, with a branched structure, the speech recognizer 200 may treat the masked audio embeddings 254 as audio embeddings 212 only belonging to one speaker (e.g., either the first speaker 10a or the second speaker 10b). Once the masked model 250 generates the respective masked audio embedding 254a, 254b for each speaker 10a, 10b, the speech recognizer 200 may separately apply the joint network 230 from each branch 208 on the respective masked embedding 254 in order to generate the respective output sequence 242 for each branch 208. In some configurations, the speech recognizer 200 combines the output sequence 242 of each branch 208 to form a sequence of characters and/or words that define the transcript 204 for the conversation between speakers 10. Based on the association of each branch 208 with a respective speaker 10, the transcript 204 may include labels indicating which speaker spoke what. The transcript 204 may also include time stamps indicating who spoke what when.

The branched structure of the speech recognizer 200 may also allow a dedicated label encoder 220 for each branch 208 such that the label encoder 220 generates (e.g., predict) labels for a given speaker 10 associated with the branch 208. In other words, the first label encoder 220a of the first speaker branch 208a predicts labels $p_{u1}$ 224, 224a for the first speaker 10a. Likewise, the second label encoder 220b of the second speaker branch 208b predicts labels $p_{u2}$ 224, 224b for the second speaker 10b.

Although FIG. 2A discloses a two branch approach, the speech recognizer 200 may be modified to accommodate for multiple potential overlapping speakers 10. For more than two overlapping speakers 10, the speech recognizer 200 may adapt in several ways. In the fixed input approach, a fixed input 252 may be assigned to each potential speaker 10 such that the masking model 250 is able to scale to support multiple speakers 10. In other words, in a conversation with three speakers 10, 10a-c, the speech recognizer 200 assigns the first speaker 10a a zero (0) as the fixed input 252 for the first speaker 10a, assigns the second speaker 10b a one (1) as the fixed input 252 for the second speaker 10b, and assigns a third speaker 10c a two (2) as the fixed input 252 for the third speaker 10c. Additionally or alternatively, FIG. 2B illustrates that the speech recognizer 200 may scale the number of masking models 250 rather than simply the number of fixed inputs 252. For example, the speech recognizer 200 includes a masking model 250 for each speaker 10. In some implementations, the speech recognizer 200 does not include a masking model 250 for each speaker 10 (e.g., in a 1-to-1 fashion), but includes more than one masking model 250 to distribute the processing of converting the encoder embedding 212 corresponding to multiple speakers 10 into a masked audio embedding 254 corresponding to a single speaker 10.

In some configurations, instead of a fixed input 252 associated with a frame of an encoded audio embedding 212, the masking model 250 receives a speaker embedding associated with a frame of an encoded audio embedding 212. The speaker embedding may identify features for a particular speaker. For instance, the speaker embedding may include i-vectors or d-vectors. With a speaker embedding approach, the masking model 250 may be trained with speaker embedding examples to learn how to accurately mask speakers based on the receipt of a particular speaker embedding. For example, during inference, when the masking model 250 receives a speaker embedding for the first speaker 10a, the masking model 250 has been trained on speaker embeddings and uses the received speaker embedding to determine a portion of the encoded audio embedding 212 that corresponds to the speaker 10 associated with the speaker embedding. Much like the fixed input approach, the masked model 250 generates masked embeddings 254 corresponding to a single speaker 10 based on the speaker embedding and encoded audio embeddings 212. From there, the speech recognizer 200 passes these masked embeddings 254 to the respective branch 208 of the speech recognizer 200 that corresponds to the single speaker 10.

In some examples, the speech recognizer 200 includes an audio encoder 210 with several layers of bidirectional LSTM with 1024 units per layer (e.g., 512 for either direction). For instance, the audio encoder 210 may be a five layer LSTM or a seven layer LSMT. The label encoder 220 may be a two layer unidirectional LTSM with 1024 units per layer. In these examples, the output vocabulary for the speech recognizer 200 may be eighty-five graphemes. The masking model 250 may be a two layer LSTM with 1024 units per layer (e.g., 512 in either direction).

Referring to FIGS. 3A-3D, the speech recognizer 200, as an E2E model, is first trained to be able to generate a target output sequence based on a given input sequence. Here, a training process 300 for the speech recognizer 200 may occur in stages. In some implementations, such as FIG. 3A, the training process 300 trains all of the components of the speech recognizer 200 besides the masking model 250 in a first training stage as though these components are a single RNN-T model instead of individual branches 208. For instance, a single RNN-T model is first trained based on training examples 302 and then the RNN-T model is divided into branches 208 to form the speech recognizer 200. Once the speech recognizer 200 is formed, a second stage of the training process (e.g., shown in FIGS. 3B-3D) proceeds to train the masking model 250. Here, the training of the masking model 250 may also perform fine-tune training for the branches 208 of the speech recognizer 200.

Figure 3B:
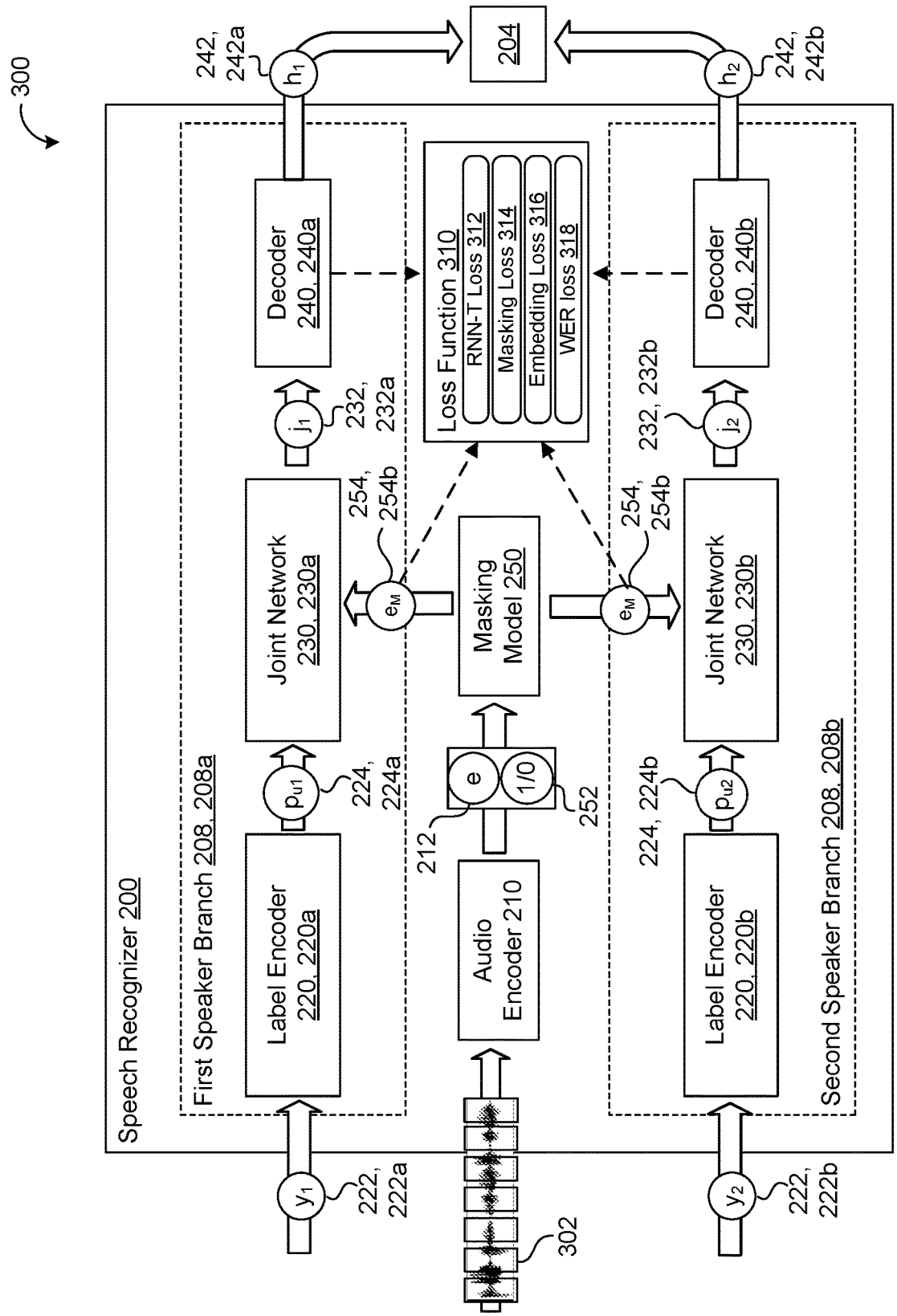

Referring to FIG. 3B, when training the speech recognizer 200, the training process 300 may use one or more types of loss functions 310 to ensure accuracy of the speech recognizer 200 during inference. These loss functions 310 may include a more conventional RNN-T loss 312, a masking loss 314, an embedding loss 316, and/or a minimum word error rate (mWER) loss 318. Depending on the granularity or design of the speech recognizer 200, the speech recognizer 200 may be trained using any one or combination of these types of loss functions 310. A conventional RNN-T loss 312 is generally defined as a summation of the negative log probabilities corresponding to the probability of a target label sequence given the input sequence over all training examples. During training, the training process 300 may use the RNN-T loss 312 either during the first training stage before forming the speech recognizer 200 and/or on a per branch basis during the second training stage for the speech recognizer 200 with branches 208. For example, in the second training stage, minimizing the RNN-T loss 312 is a training objective for each branch 208 of the speech recognizer 200.

Figure 3C:
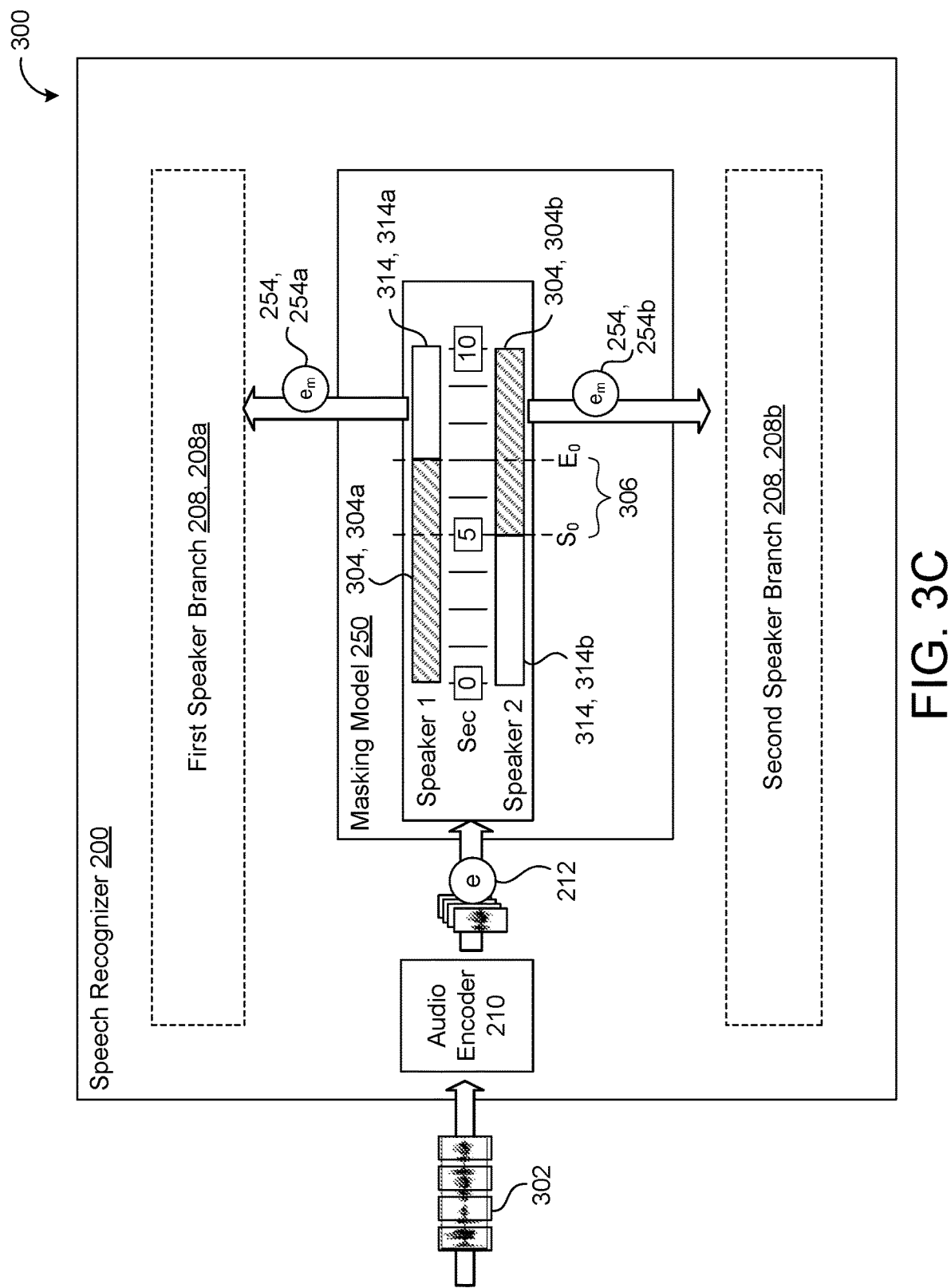
Figure 3D:
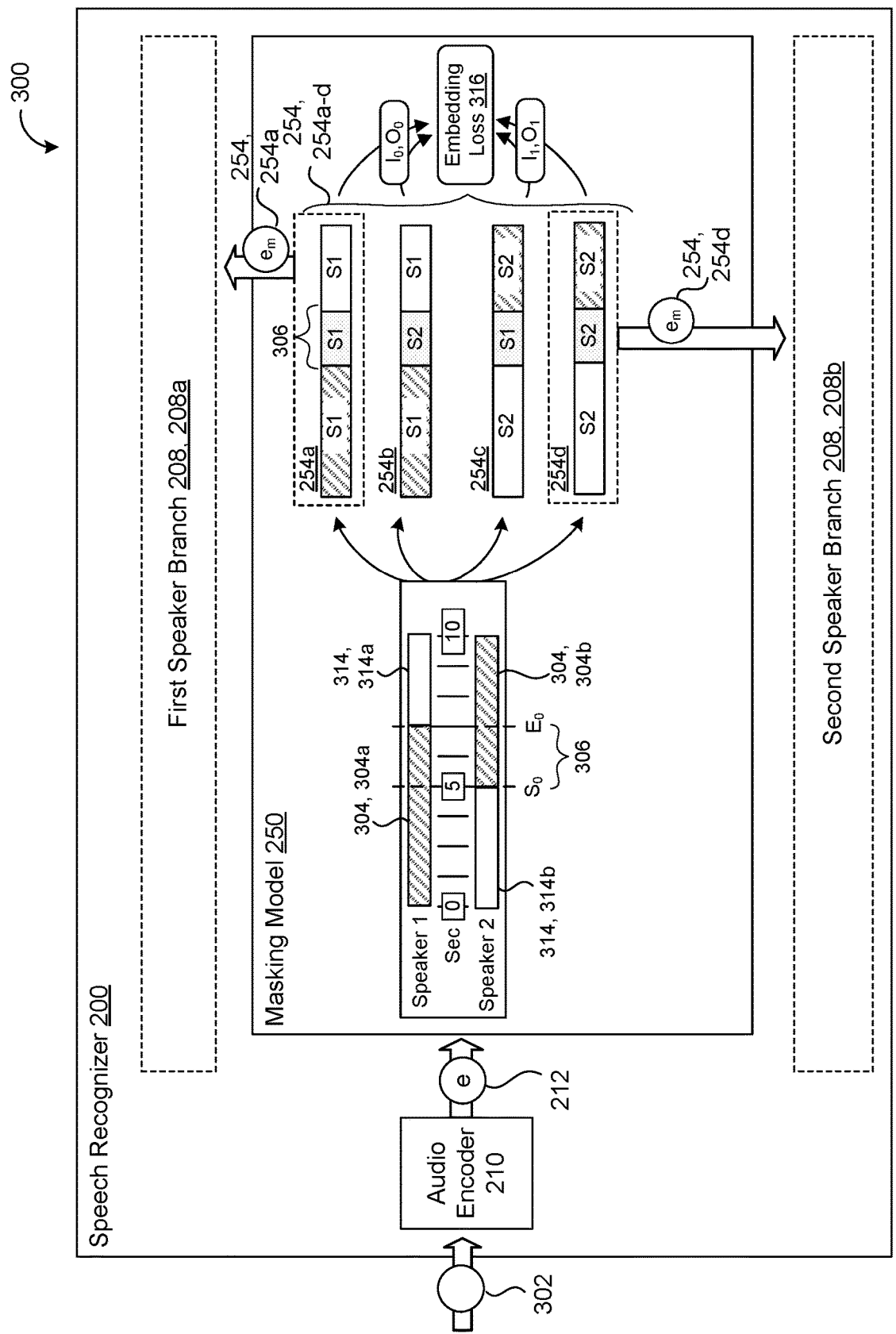

Referring to FIGS. 3C and 3D, the second stage of the training process 300 trains the masking model 250. In the second stage, the audio encoder 210 receives a training example 302 corresponding to a training monophonic audio signal with an overlapping speech region or segment 306 and converts the training audio signal into frames of an encoded audio embedding 212. In some examples, the training example 302 corresponds to a simulated audio signal. Here, a simulated audio signal refers to an audio signal that has been generated with particular parameters. This is in contrast to a training process using training examples of actual audio speech segments where information regarding the overlapping speech segment contained within the training example may be unknown. By having known information regarding when the overlapping speech segment (or region) occurs, such as a start time and an end time, the speech recognizer 200 (e.g., the masking model 250) does not need to complicate the training process 300 by learning these additional parameters during training.

As a simulated audio signal, the training example 302 may include a first segment 304, 304a of audio where a first speaker 10a is speaking, a second segment 304, 304b of audio where a second speaker 10b is speaking, and an overlapping region 306 where the first segment 304a overlaps the second segment 304b. For instance, FIGS. 3C and 3D illustrate examples where training example 302 is ten seconds long with a first segment 304a corresponding to the first seven seconds of the training example 302. A second segment 304b of the training example 302 occurs starting at the fifth second and extends to the tenth second of the training example 302. Here, the overlapping region 306 occurs from the fifth second of the training example 302 to the seventh second of the training example 302.

In some configurations, the use of independent RNN-T losses 312 for each branch 208 may cause the RNN-T loss 312 for one branch 208 to align a label 224 for a speaker corresponding to that branch 208 to audio belonging to another branch 208 (misalign the labels for speakers). To prevent learning misalignment, the training process 300 uses a masking loss 314 that capitalizes on the known start time $S_O$ of the overlapping region 306 and the known end time $E_O$ of the overlapping region 306 for a simulated training example 302. By having these known timing parameters $S_O$, $E_O$, the training process 300 generates a respective masked audio embedding 254a, 254b for each speaker 10 that indicates when the speaker 10 is speaking and also when the speaker 10 is not speaking. By including an indication in the respective masked audio embedding 254 where the speaker 10 is not speaking, the indication prevents the RNN-T loss 312 from misaligning labels for speakers 10. In other words, previously without an indication in a masked audio embedding 254 that the speaker 10 is speaking or not speaking, the speech recognizer 200 may learn to align words from a first speaker 10a to audio frames of the second speaker 10b even though the second speaker 10b was not speaking. When the masked embedding 254 includes such an indication, the speech recognizer 200 learns not to make this misalignment error.

In some implementations, during training, the respective masked embedding 254 for a given speaker 10 includes the indication of when the speaker 10 is speaking by determining which speaker 10 is speaking during the different segments 304 of the training example 302. For example, for a particular speaker 10, the training process 300 determines whether that particular speaker 10 was speaking prior to the known start time $S_O$ of the overlapping region 306 and whether that particular speaker 10 was speaking after the known end time $E_0$ of the overlapping region 306. When the training example 302 is configured such that the same speaker 10 is not speaking both before and after the overlapping region 306, the training process 300 determines whether the particular speaker 10 was speaking prior to the known start time $S_O$ of the overlapping region 306 or after the known end time $E_0$ of the overlapping region 306. Here, during training, the masking model 250 is taught to apply a respective masking loss 314 to the segment 304 of the training example 302 where the speaker 10 was not speaking. Stated differently, when a speaker 10 was speaking prior to the known start time $S_O$ in the training example 302, the masking model 250 applies, to the respective masked audio embedding 254 for that speaker 10, the respective masking loss 314 after the known end time $E_O$ of the training example 302 (or vice versa). The masking loss 314 attempts to make all the masked activations zero after the known end time $E_O$ to prevent any word of the speaker 10 from aligning after the known end time $E_O$. In some examples, the masking loss 314 corresponds to a L2 loss function that minimizes the squared differences of the masked audio embedding 254.

With specific reference to FIG. 3C, while training, the masking model 250 identifies that the first segment 304a corresponds to the first speaker 10a speaking and generates a respective masked audio embedding 254a for this segment 304a. The masking model 250 also identifies that the first speaker 10a was not speaking during the second segment 304b and applies a first masking loss 314, 314a to include as part of the masking embedding 254a for the first speaker 10a. The masking model 250 then communicates the masked embedding 254a with the first masking loss 314a to the first speaker branch 208a. Similarly, the masking model 250 identifies that the second segment 304b corresponds to the second speaker 10b speaking and generates a respective masked audio embedding 254b for this segment 304b. The masking model 250 also identifies that the second speaker 10b was not speaking during the first segment 304a and applies a second masking loss 314, 314b to include as part of the respective masking embedding 254b for the second speaker 10b. The masking model 250 then communicates the respective masked embedding 254b with the masking loss 314b to the second speaker branch 208b.

In some configurations, such as FIG. 3D, the training process 300 additionally or alternatively includes the embedding loss 316. Specifically, in these configurations, the training process 300 applies the embedding loss 316 to each of the masked audio embedding 254a generated for the first speaker 10a and the respective masked audio embedding 254b generated for the second speaker 10b. The embedding loss 316 is configured to enforce that an entirety of the respective masked audio embedding 254 generated for each speaker 10 corresponds to only audio spoken by that speaker 10. In other words, since the masking model 250 should separate encoder features (e.g., from the encoded embedding 212) at each audio frame, the embedding loss 316 ensures that features of each masked embedding 254 maintain the same speaker embedding both inside and outside the overlapping region 306. For example, the training process 300 computes an average speaker embedding vector for the respective masked embeddings 254a, 254b for each speaker 10a, 10b both inside and outside the overlapping region 306. The speaker embedding loss 316 may be represented as follows:

$$\text{EmbLoss}=\cos(I_O,O_o)+\cos(I_1,O_1)-\cos(I_O,O_1)-\cos(I_1,O_o) \quad (2)$$

where $I_0$ is the average speaker embedding computed for the respective masked embedding 254a for the first speaker 10a inside the overlapping region 306, $I_1$ is the average speaker embedding computed for the respective masked embedding 254b for the second speaker 10b inside the overlapping region 306, $O_0$ is the average speaking embedding computed for the respective masked embedding 254a for the first speaker outside the overlapping region 306, $O_1$ is the average speaking embedding computed for the respective masked embedding 254b for the second speaker 10b outside the overlapping region 306, and cosine denotes the cosine similarity. Accordingly, the training process 300 may generate the embedding loss 316 based on a function of the $I_0$, $I_1$, $O_0$, and $O_1$.

FIG. 3D illustrates a situation where the embedding loss 316 is a loss function 310 that helps ensure the entirety of the respective masked audio embedding 254 generated for each speaker 10 corresponds to only audio spoken by that speaker 10. Here, FIG. 3D shows that the masking model 250 correctly identifies the speaker 10 (e.g., shown as S1 for the first speaker 10a and S2 for the second speaker 10b) for the portions of the audio signal 202 outside the overlapping region 306, but may incorrectly identify the speaker 10 within the overlapping region 306. For example, FIG. 3D depicts different permutations of masked embeddings 254, 254a-d that the masking model 250 may generate during the training process 300. In this example, the masking model 250 may generate a masked embedding 254 for the first speaker 10a with the overlapping region 306 that corresponds to speech of the second speaker 10b (e.g., labeled as a second masked embedding 254b) and a masked embedding 254 for the second speaker 10b with the overlapping region 306 that corresponds to speech of the first speaker 10b (e.g., shown as the fourth masked embedding 252d). Since the overlapping region 206 is a critical region for multi-talker speech recognition, the training process 300 may use the embedding loss 316 to train the masking model 250 to prevent this type of cross-speaker embedding from occurring. In some implementations, the training process 300 computes the average speaker embedding for the inside of the overlapping region 306 (designated as I) and the average speaker embedding for outside of the overlapping region 306 (designated as O) for each masked embedding 254 (e.g., the four masked embeddings 254a-d) and the embedding loss 316 indicates a masked embedding 254 that entirely corresponds to speech from a single speaker 10. In FIG. 3D, using the embedding loss 316 as a loss function 310, the embedding loss 316 is able to identify that the first masked embedding 254a entirely corresponds to speech from the first speaker 10a and the fourth masked embedding 254d entirely corresponds to speech from the second speaker 10b. Both of these masked embeddings 254a,d are then passed to the correct branches 208.

Another loss function 310 that the training process 300 may use to optimize the speech recognition of the speech recognizer 200 is a word error rate loss 318. Generally speaking, in addition to the speech recognizer 200 operating with low latency, the speech recognizer 200 also needs to be accurate at recognizing speech. Often for models that perform speech recognition, a metric that may define an accuracy of a model is a word error rate (WER). A WER refers to a measure of how many words are changed compared to a number of words actually spoken. Commonly, these word changes refer to substitutions (i.e., when a word gets replaced), insertions (i.e., when a word is added), and/or deletions (i.e., when a word is omitted). To illustrate, a speaker says "car," but an ASR system transcribes the word "car" as "bar." This is an example of a substitution due to phonetic similarity. When measuring the capability of an ASR system compared to other ASR systems, the WER may indicate some measure of improvement or quality capability relative to another system or some baseline. As such, the training example 302 may include a first ground truth transcript corresponding to the first segment 304a of audio spoken by the first speaker 10a and a second ground truth transcript corresponding to the second segment 304a of audio spoken by the second speaker 10b. Here, the training process 300 minimizes WER using the first and second ground truth transcriptions.

When a speech recognizer 200 operates during inference, the speech recognizer 200 generates n number of output sequences 242, 242a-n where each output sequence 242 corresponds to a transcript 204 for a particular speaker 10. In the case of two speakers 10a-b, the first decoder 240a generates an output sequence 242a for the first speaker 10a and the second decoder 240b generates output sequence 242b for the second speaker 10b. During training, the accuracy of training output sequences 242 may be compared to the aforementioned ground truth transcripts for the training example 302 to minimize WER using stochastic gradient descent. In other words, each training example 302 may be associated with a ground truth transcript for each speaker in the training example 302. However, because it may not be known which ground-truth transcript corresponds to which output sequence 242, the WER may be determined for both possibilities. In some examples, the WER loss 318 may be represented by a score corresponding to the minimum WER among all the possibilities. The error for two speakers 10a-b may be represented as follows:

$$\text{ErrTwoSpeaker}(h_1,h_2,r_1,r_2)=\min(\text{Err}(h_1,r_1)+\text{Err}(h_2,r_2),\text{Err}(h_1,r_2)+\text{Err}(h_2,r_1)) \quad (3)$$

where $r_1$ is a first ground truth transcript, $r_2$ is a second ground truth transcript, $h_1$ is the first predicted output sequence 242a for the first speaker 10a, $h_2$ is the second predicted output 242b for the second speaker 10b, and Err(h,r) computes the number of edit distance errors between the reference transcript r and the hypothesis h. Based on this error, the WER may be represented as follows:

$$WER = \frac{\text{ErrTwoSpeaker}(h_1, h_2, r_1, r_2)}{N(r_1) + N(r_2)} \quad (4)$$

Where N(r) is the number of words in the reference transcript r.

Figure 4:
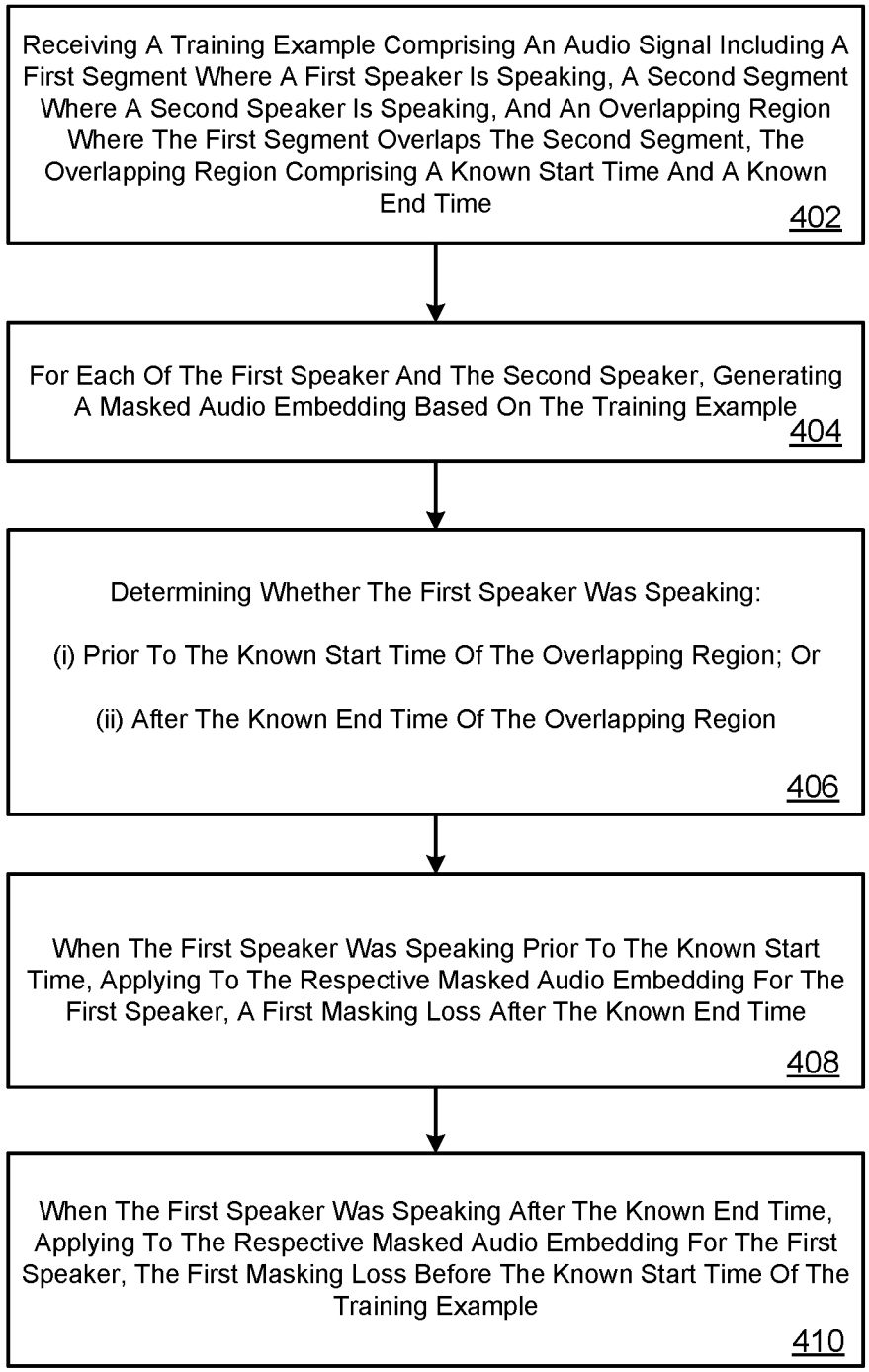
FIG. 4 is a flow chart of an example arrangement of operations for a method of end-to-end multi-talker overlapping speech recognition.

FIG. 4 is a flowchart of an example arrangement of operations for a method of end-to-end multi-talker overlapping speech recognition. The method 400 trains a speech recognition model 200 with a loss function 310. At operation 402, the method receives a training example 302 including an audio signal including a first segment 304, 304a corresponding to audio spoken by a first speaker 10, 10a, a second segment 304, 304b corresponding to audio spoken by a second speaker 10, 10b, and an overlapping region 306 where the first segment 304, 0304a overlaps the second segment 304, 304b. The overlapping region 306 includes a known start time $S_0$ and a known end time $E_0$. For each of the first speaker 10, 10a and the second speaker 10, 10b, the method 400, at operation 404, generates a respective masked audio embedding 254 based on the training example 302. At operation 406, the method 400 determines whether the first speaker 10, 10a was speaking prior to the known start time $S_0$ of the overlapping region 306 or after the known end time $E_0$ of the overlapping region 306. When the first speaker 10, 10a was speaking prior to the known start time $S_0$ of the overlapping region 306, at operation 408, the method 400 applies, to the respective masked audio embedding 254 for the first speaker 10, 10a, a first masking loss 312 after the known end time $E_0$. When the first speaker 10, 10a was speaking after the known end time $E_0$ of the overlapping region 306, at operation 410, the method 400 applies, to the respective masked audio embedding 254 for the first speaker 10, 10a the masking loss 312 to the generated masked audio embedding 254 before the known start time $S_0$.

Figure 5:
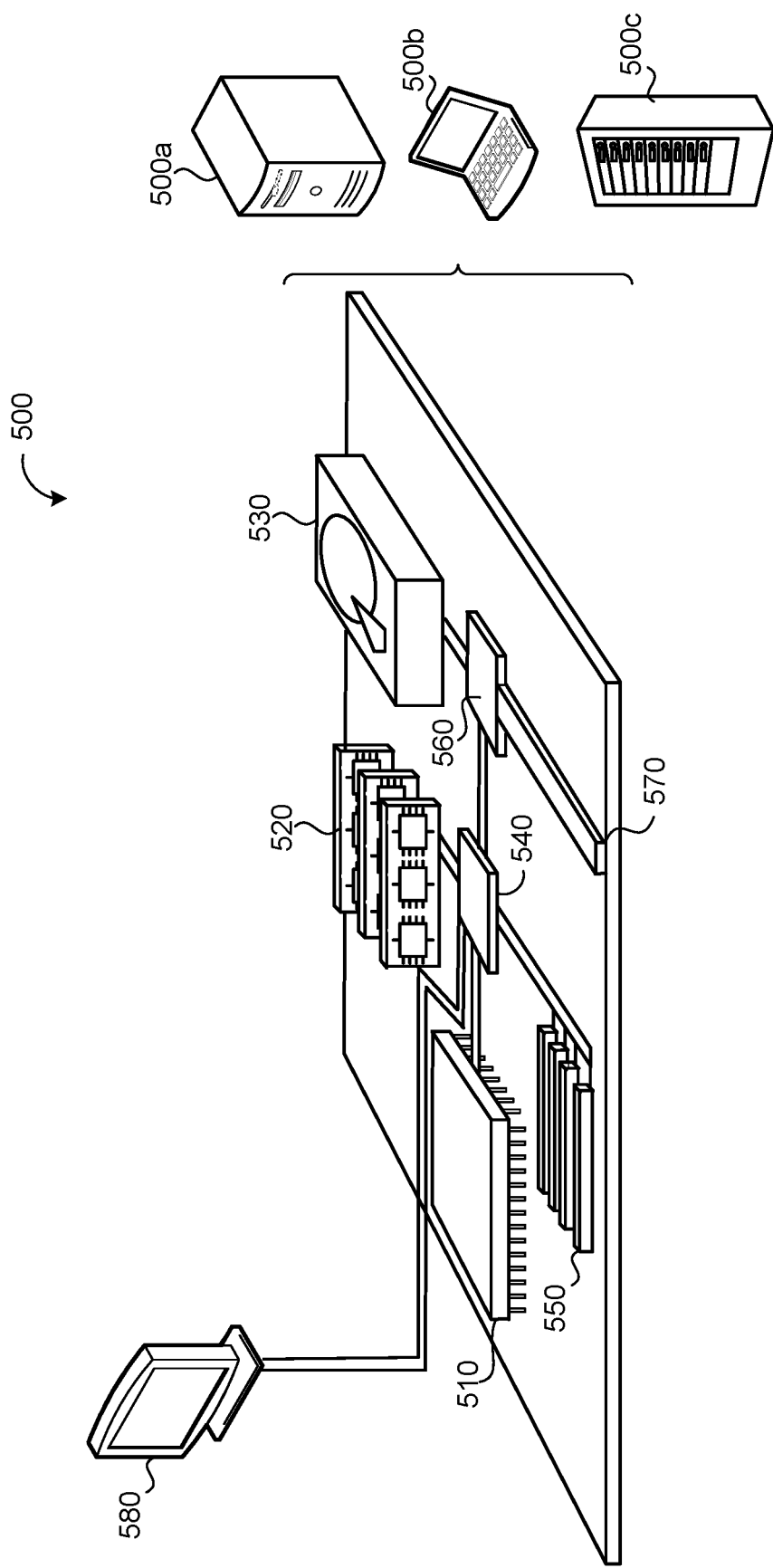
FIG. 5 is a schematic view of an example computing device that may be used to implement the systems and methods described herein.

FIG. 5 is schematic view of an example computing device 500 that may be used to implement the systems (e.g., the speech recognizer 200) and methods (e.g., the method 300) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving a sequence of acoustic frames characterizing a speech conversation between two or more speakers;
   encoding, by an audio encoder of a speech recognition model, the sequence of acoustic frames into corresponding audio embeddings;
   for each corresponding audio embedding:
      receiving a speaker embedding associated with the corresponding audio embedding;
      identifying a respective speaker among the two or more speakers that is associated with the corresponding audio embedding based on the speaker embedding;
      concatenating the corresponding audio embedding with the speaker embedding; and
      generating, using a masking model, a masked embedding corresponding to the identified respective speaker based on the corresponding audio embedding concatenated with the speaker embedding; and
   for each respective speaker among the two or more speakers, generating, by a dedicated speaker branch of the speech recognition model for the respective speaker that receives each masked embedding corresponding to the respective speaker, a respective transcription that transcribes a respective segment of the speech conversation spoken by the respective speaker,
   wherein a training process trains the masking model and the each of the dedicated speaker branches by:
      in a first stage, training a single recurrent neural network-transducer (RNN-T) model using training examples;
      dividing the single RNN-T model into each of the dedicated speaker branches; and
      in a second stage, training the masking model and fine-tuning each of the dedicated speaker branches using the training examples by applying a respective masking loss to a segment of each training example of the training examples where a speaker is not speaking to minimize an RNN-T loss for each dedicated speaker branch of the masking model.

2. The method of claim 1, wherein the speech recognition model comprises a recurrent neural network-transducer (RNN-T) architecture.

3. The method of claim 2, wherein the dedicated speaker branch of the speech recognition model for the respective speaker comprises:
- a dedicated label encoder for the respective speaker configured to:
  - receive, as input, sequences of non-blank symbols output by a dedicated final softmax layer for the respective speaker; and
  - generate labels for the respective speaker; and
- a dedicated joint network for the respective speaker configured to:
  - receive, as input, the labels for the respective speaker generated by the dedicated label encoder and each masked embedding corresponding to the respective speaker; and
  - generate, at each of a plurality of output steps, a probability distribution over possible speech recognition hypotheses for the respective speaker.

4. The method of claim 3, wherein generating the respective transcription that transcribes the respective segment of the speech conversation spoken by the respective speaker is based on the probability distribution over possible speech recognition hypotheses generated at each of the plurality of output steps for the respective speaker.

5. The method of claim 1, wherein the operations further comprise:
- for each corresponding audio embedding, determining a fixed input assigned to the respective speaker associated with the corresponding audio embedding,
- wherein identifying the respective speaker among the two or more speakers that is associated with the corresponding audio frame is based on the fixed input.

6. The method of claim 1, wherein the operations further comprise generating a transcript of the speech conversation between the two or more speakers based on the respective transcription generated for each respective speaker among the two or more speakers.

7. The method of claim 1, wherein the operations further comprise displaying the transcription on a display screen in communication with the data processing hardware.

8. The method of claim 1, wherein:
- wherein the sequence of acoustic frames characterizing the speech conversation are segmented from a monophonic signal captured by a user device; and
- the data processing hardware resides on the user device.

9. An automated speech recognition (ASR) model comprising:
- an audio encoder configured to:
  - receive, as input, a sequence of acoustic frames characterizing a speech conversation between two or more speakers; and
  - generate, at each of a plurality of output steps, an audio embedding corresponding to each acoustic frame in the sequence of acoustic frames;
- a masking model configured to:
  - receive, as input, the audio embedding generated by the audio encoder at each of the plurality of output steps;
  - receive, as input, a speaker embedding associated with each corresponding audio embedding generated by the audio encoder at each of the plurality of output steps, the speaker embedding identifying a respective speaker among the two or more speakers that is associated with the corresponding audio embedding; and
  - generate, at each of the plurality of output steps, a respective masked embedding for the respective speaker among the two or more speakers that is associated with the audio embedding generated by the audio encoder at the corresponding output step, the respective masked embedding based on a concatenation of the speaker embedding that identifies the respective speaker among the two or more speakers that is associated with the corresponding audio embedding at the corresponding output step; and
- for each respective speaker among the two or more speakers, a dedicated speaker branch configured to:
  - receive, as input, each respective masked embedding generated by the masking model for the respective speaker; and
  - generate a respective transcription that transcribes a respective segment of the speech conversation spoken by the respective speaker,
- wherein a training process trains the masking model and the each of the dedicated speaker branches by:
  - in a first stage, training a single recurrent neural network-transducer (RNN-T) model using training examples;
  - dividing the single RNN-T model into each of the dedicated speaker branches; and
  - in a second stage, training the masking model and fine-tuning each of the dedicated speaker branches using the training examples by applying a respective masking loss to a segment of each training example of the training examples where a speaker is not speaking to minimize an RNN-T loss for each dedicated speaker branch of the masking model.

10. The ASR model of claim 9, wherein the speech recognition model comprises a recurrent neural network-transducer (RNN-T) architecture.

11. The ASR model of claim 10, wherein the dedicated speaker branch for each respective speaker comprises:
- a dedicated label encoder for the respective speaker configured to:
  - receive, as input, sequences of non-blank symbols output by a dedicated final softmax layer for the respective speaker; and
  - generate labels for the respective speaker; and
- a dedicated joint network for the respective speaker configured to:
  - receive, as input, the labels for the respective speaker generated by the dedicated label encoder and each respective masked embedding generated by the masking model for the respective speaker; and
  - generate, at each of a plurality of output steps, a probability distribution over possible speech recognition hypotheses for the respective speaker.

12. The ASR model of claim 11, wherein the dedicated speaker branch for the respective speaker generates the respective transcription that transcribes the respective segment of the speech conversation spoken by the respective speaker based on the probability distribution over possible speech recognition hypotheses generated at each of the plurality of output steps for the respective speaker.

13. The ASR model of claim 9, wherein:
- the masking model is further configured to receive, for each corresponding audio embedding, a fixed input assigned to the respective speaker among the two or more speakers that is associated with the corresponding audio embedding; and the masking model is configured to generate the respective masked embedding for the respective speaker based on the fixed input received for each corresponding audio embedding.

14. The ASR model of claim 9, wherein a number of dedicated speaker branches is scalable based on a number of the two or more speakers speaking in the speech conversation characterized by the sequence of acoustic frames.

15. The ASR model of claim 9, wherein:
the sequence of acoustic frames characterizing the speech conversation are segmented from a monophonic signal captured by a user device; and
the ASR model executes on the user device.

16. The ASR model of claim 9, wherein the respective transcription generated by the dedicated speaker branch for each respective speaker among the two or more speakers is displayed on a screen of a user device.

* * * * *